United States Patent
Jabri et al.

(10) Patent No.: US 8,063,999 B2
(45) Date of Patent: Nov. 22, 2011

(54) GLASS POLARIZER AND MANUFACTURING METHOD THEREOF

(75) Inventors: Khaled Jabri, Kanagawa (JP);
Nobuhito Takeshima, Chiba (JP);
Atsushi Arai, Tokyo (JP); Hiromichi Nishimura, Kanagawa (JP); Toshiharu Yamashita, Tokyo (JP); Yoshihiko Noro, Kanagawa (JP)

(73) Assignee: Okamoto Glass Co., Ltd., Chiba (JP)

( * ) Notice: Subject to any disclaimer, the term of this patent is extended or adjusted under 35 U.S.C. 154(b) by 189 days.

(21) Appl. No.: 12/226,814

(22) PCT Filed: Mar. 4, 2008

(86) PCT No.: PCT/JP2008/000438
§ 371 (c)(1),
(2), (4) Date: Feb. 13, 2009

(87) PCT Pub. No.: WO2008/129763
PCT Pub. Date: Oct. 30, 2008

(65) Prior Publication Data
US 2010/0134705 A1    Jun. 3, 2010

(30) Foreign Application Priority Data
Apr. 13, 2007  (JP) ................................. 2007-106338

(51) Int. Cl.
*G02F 1/1335* (2006.01)
*C03C 1/00* (2006.01)
*C03B 21/00* (2006.01)

(52) U.S. Cl. ................................. 349/8; 501/32; 65/102

(58) Field of Classification Search .................. None
See application file for complete search history.

(56) References Cited

U.S. PATENT DOCUMENTS

| 2,319,816 | A | * | 5/1943 | Land | 359/490 |
| 2,454,515 | A | * | 11/1948 | Land | 359/491 |
| 4,479,819 | A | * | 10/1984 | Borelli et al. | 65/30.11 |
| 7,618,908 | B2 | * | 11/2009 | Borrelli et al. | 501/19 |
| 2003/0064875 | A1 | * | 4/2003 | Yamashita et al. | 501/32 |

FOREIGN PATENT DOCUMENTS

| EP | 0 658 524 | 6/1995 |
| JP | 62-66367 | 3/1987 |
| JP | 2-40619 | 9/1990 |
| JP | 2628014 | 7/1997 |

(Continued)

OTHER PUBLICATIONS

N. Nishida, "Big-Screen Display (Series, Advanced Display Technology 7)", Kyoritsu Shuppan, Tokyo, 2002.

(Continued)

*Primary Examiner* — Uyen Chau N Le
*Assistant Examiner* — Chris Chu
(74) *Attorney, Agent, or Firm* — Clark & Brody

(57) ABSTRACT

A glass polarizer having an excellent transmittance and extinction ratio with respect to light in the visible light range including blue using silver halide containing glass as a starting material is provided.

A manufacturing method according to the present invention to manufacture glass polarizers is characterized in that borosilicate glass in which silver halide particles are dispersed and deposited by heat treatment is reduced to generate metallic silver particles from at least a portion of silver halide and then, heated for stretching to generate silver halide particles oriented and stretched in the glass.

2 Claims, 13 Drawing Sheets

FOREIGN PATENT DOCUMENTS

| | | |
|---|---|---|
| JP | 2740601 | 1/1998 |
| JP | 2885655 | 2/1999 |
| JP | 2000-206507 | 7/2000 |
| JP | 2002-519743 | 7/2002 |
| JP | 2003-279749 | 10/2003 |
| JP | 2004-77850 | 3/2004 |
| JP | 3549198 | 4/2004 |
| JP | 2004-523804 | 8/2004 |
| JP | 2005-157402 | 6/2005 |
| JP | 2006-313343 | 11/2006 |

OTHER PUBLICATIONS

S. Link et al., "Spectral Properties and Relaxation Dynamics of Surface Plasmon Electronic Oscillations in Gold and Silver Nanodots and Nanorods", *J. Phys. Chem. B* 1999, 103, 8410-8426.

K. Suzuki, Kogyo Zairyo vol. 52, No. 12, pp. 102-107.

* cited by examiner

STEP 1 (GLASS)

STEP 2 (DEPOSITION)

SILVER CHLORIDE PARTICLE

STEP 3 (STRETCHING)

STEP 4 (REDUCTION)

METALLIC SILVER PARTICLE

STEP 1 (GLASS)

STEP 2 (DEPOSITION)

SILVER CHLORIDE PARTICLE

STEP 3 (REDUCTION)

REDUCED SILVER CHLORIDE FINE PARTICLE

STEP 4 (STRETCHING)

GLASS POLARIZER AND MANUFACTURING METHOD THEREOF

TECHNICAL FIELD

The present invention relates to a glass polarizer and a manufacturing method thereof and, in particular, relates to a glass polarizer having polarization characteristics industrially usable for light in a wavelength range including visible light and a manufacturing method thereof. Further, the present invention relates to a liquid crystal display using a glass polarizer having polarization characteristics industrially usable for light in a wavelength range including visible light.

BACKGROUND ART

A polarizer (polarizing element) has a function to selectively pass light having a predetermined polarization plane and is widely used in various optical systems. Major fields of use of polarizers include devices for optical communication and liquid crystal displays including projection-type liquid crystal displays. The present invention is a technology applicable to polarizers used in wide areas. A polarizer according to the present invention will be described by focusing on application to a projection-type liquid crystal display to show characteristics characterized particularly in a visible light region.

In recent years, projection-type liquid crystal displays are widely used as display units for displaying on a big screen. Rear projection-type liquid crystal displays are mainly used for big-screen TVs and front projection-type liquid crystal displays for presentation of personal computer data. A projection-type liquid crystal display has a structure to enlarge and project an image on small liquid crystal elements onto a big screen by using an optical system of projection. A detailed technical description can be found, for example, in Non-Patent Document 1 (big-screen display).

FIG. 1 shows a configuration of a typical projection-type liquid crystal display. Light from a light source 4 is separated into blue (B), green (G), and red (R) components by optical components 5 to 16. The separated lights are guided to corresponding liquid crystal elements 2B, 2G, and 2R, respectively. The liquid crystal elements 2R, 2G, and 2B have incident-side polarizers 1R, 1G, and 1B on the incident side and exit-side polarizers 3R, 3G, and 3B on the exit side, respectively. A set of polarizers each having an incident-side polarizer and an exit-side polarizer corresponding to red, green, or blue has a function to selectively allow light passed through the liquid crystal element in a predetermined polarization direction to pass. This function allows lights in three primary colors passed through the liquid crystal elements 2B, 2G, and 2R to become a light intensity modulated image signal. These lights in three primary colors are further synthesized optically by a synthesis prism 17 and further projected onto a screen 19 through a magnifying projector lens system 18.

Polarization characteristics required for a polarizer include a property that transmits optical signals having a desired polarization plane, while at the same time blocking unnecessary optical signals having a polarization plane perpendicular thereto. That is, a desired property is to have a large transmittance with respect to light having a desired polarization plane and a small transmittance with respect to light having a polarization plane perpendicular thereto.

The ratio of these transmittances is called an extinction ratio and is widely used by those skilled in the art as a performance index representing performance of a polarizer. Performance required for polarizers applied to a projection-type liquid crystal display is to have a large transmittance and a large extinction ratio with respect to an optical signal. For a projection-type liquid crystal display, performance required for a polarizer is said to preferably have the transmittance of 70% or more with respect to light of the wavelength to be used and the extinction ratio of 10:1, preferably 3000:1 (Patent Document 1). Values of the transmittance and extinction ratio required for a polarizer are determined depending on a device to which the polarizer is applied.

A social demand for a projection-type liquid crystal display is a demand to realize bigger and clearer images by a smaller device. To realize this demand, a recent technical trend is to apply a light source of a larger quantity of light and to use smaller liquid crystal elements. As a result, light of higher energy density is introduced not only to liquid crystal elements, but also to polarizers placed before and after the liquid crystal elements. Particularly high heat resistance and light resistance are increasingly demanded for polarizers having a function to absorb unnecessary light.

According to principles of polarizers, dichromatic polarizers that selectively absorb light depending on the polarization plane and non-dichromatic polarizers (such as a Brewster polarizer) are known (See Patent Document 2). Dichromatic polarizers have thin elements and do not need any special device to absorb unnecessary light and thus are desired for projection-type liquid crystal displays whose miniaturization is particularly demanded.

Currently, dichromatic polarizers realizing practical optical performance in the visible light region are only polarizing films made of organic material. However, polarizers made of organic resin have a fatal defect of low heat resistance (See Patent Document 1).

To rectify the defect, polarizing films made of organic resin are used by sticking polarizing films to a sapphire substrate having a high thermal conductivity (Patent Document 3). However, the polarization function of polarizers stuck to sapphire having an excellent thermal conductivity may be degraded due to technical requirements of higher intensity in recent years, that is, light absorption/heat generation in a green region with the highest intensity. Thus, a cooling device including a cooling fan is installed in a projection-type liquid crystal display to protect organic resin films from heat. The cooling device not only is against social needs of miniaturization, but also creates another problem of noise.

As a method to solve this technical problem, an idea of applying polarizing glass applied to elements for optical communication to projection-type liquid crystal displays has been proposed (Patent Document 1). However, the invention disclosed in Patent Document 1 does not disclose any technology to provide effective characteristics to glass polarizing elements with respect to light in the visible light region.

Here, the technical background of polarizing glass will be briefly described. As schematically shown in FIG. 2, the polarizing glass is glass characterized in that metallic fine particles 102 having shape anisotropy oriented and dispersed in an optically transparent glass substrate 100 are contained. Polarization characteristics are realized by using an anisotropic resonance absorption phenomenon of surface plasmons present on the surface of the metallic fine particles 102 (See Patent Document 4 and Non-Patent Document 2).

FIG. 3 shows surface plasmon absorption characteristics of metallic fine particles cited from Patent Document 4. Wavelength dependence (solid line) of optical absorbance depending on the polarization plane when light having polarizability is transmitted through glass in which metallic fine particles shown in FIG. 2 are dispersed is shown in FIG. 3. FIG. 2 shows a case in which metallic fine particles have shape anisotropy and, as a special case thereof, metallic fine particles may be spherical having no shape anisotropy. In FIG. 3, surface plasmon absorption of spherical metallic fine particles is shown as a reference state (broken line).

The broken line A in FIG. 3 corresponds to surface plasmon resonance absorption by spherical metallic fine particles. Resonance absorption of metallic fine particles having shape anisotropy shows different characteristics due to correlations between the polarization plane of incident light and metallic fine particles having shape anisotropy. When the polarization plane is in parallel with the longitudinal direction of metallic fine particles, characteristics indicated by B are exhibited. It is seen that the wavelength of resonance absorption is shifted to a longer wavelength as compared with the characteristics A. It is known that this resonance absorption wavelength depends on the ratio of a longer diameter to a shorter diameter of metallic fine particles and the resonance absorption wavelength becomes larger as the ratio increases (See Non-Patent Document 2). With respect to light having the polarization plane perpendicular to the longitudinal direction, on the other hand, properties shown by a solid line C are exhibited. That is, resonance absorption is more exhibited for light of a shorter wavelength than that of the resonance wavelength of spherical metallic fine particles.

From the graph shown in FIG. 3, it is understood that the glass exhibits polarization characteristics with respect to light near 600 nm. That is, the glass has a small transmittance with respect to light having the polarization plane in parallel with the longitudinal direction of metallic particles due to strong absorption. On the other hand, the glass shows poor absorption of light having the polarization plane perpendicular to the longitudinal direction of metallic particles and, therefore, a larger transmittance. As shown in FIG. 2, polarization characteristics are realized by light having a polarization plane perpendicular to the longitudinal direction of metallic fine particles being selectively transmitted through the glass.

Many technologies have been proposed for polarizing glass and glass polarizers using polarizing glass. Many of these technologies relate to glass polarizers applicable to light in the infrared region (such as Patent Document 5 and Patent Document 6) and few technology applicable to light in the visible light region used in a projection-type liquid crystal display, which is an object of the present invention, is disclosed.

Patent Document 7 discloses a technology to provide polarizers effective for light in the visible light region by using characteristics of copper fine particles having shape anisotropy. Characteristics disclosed in Patent Document 7 are shown in FIG. 4. As seen in FIG. 4, a large extinction ratio particularly for wavelengths equal to 600 nm or less cannot be realized. That is, the ratios (extinction ratios) of values of parallel transmittance curves D and F to those of transmittance curves C and E perpendicular to the stretch axis are small and also the value of the transmittance C is only 10 to 30%, leading to a conclusion that the polarizer does not have practical characteristics.

Patent Document 8 discloses a technology to realize dichromatic absorption with respect to wavelengths in the visible light region. However, there is no specific and quantitative description to realize a high transmittance and a high extinction ratio and thus, the technology cannot be considered to be able to realize polarizers. Like Patent Document 8, Patent Document 9 proposes a technology to obtain an effective extinction ratio in the visible light region, but no technology to realize a high transmittance is disclosed.

CODIXX AG offers polarizing glass effective in the visible light region by using a manufacturing technique providing shape anisotropy to silver fine particles by introducing silver ions by diffusion from the glass surface, causing silver fine particles to deposit by heat treatment and stretching the glass (Non-Patent Document 3). However, since the ion diffusion process is generally unstable and concentrations of silver ions are distributed in the thickness direction of the glass, dimensions of generated silver particles tend to be non-uniform. As a result, the ion diffusion process has a weak point of producing fluctuations in characteristics of polarizers.

A different manufacturing method from the above technique of CODIXX AG is used for infrared glass polarizers for communication industrially widely used(Patent Document 4 and Patent Document 5). As schematically shown in FIG. 5, glass in which halogen and silver ions are melted is produced as step 1 (glass production). Next, silver halide fine particles are caused to deposit by heat treatment as step 2 (silver halide deposition). Next, glass in which needle-shaped fine particles of silver halide are oriented and dispersed is produced by stretching glass in which silver halide fine particles are dispersed as step 3 (glass stretch). Lastly, silver fine particles having shape anisotropy are generated by reducing silver halide as step 4 (reduction).

Conventionally, it is understood that polarizers manufactured by this manufacturing method do not exhibit practical performance that can be used for visible light region (Patent Document 5).

FIG. 6 is cited from Patent Document 5 and does not realize performance that is required for a polarizer applicable to projection-type liquid crystal displays. The cause thereof will be described using FIG. 4.

The curve C in FIG. 4 shows that surface plasmon resonance absorption with respect to light having a polarization plane perpendicular to the longitudinal direction of metallic fine particles having shape anisotropy is present at about 350 nm to 400 nm. At the same time, the curve C in FIG. 4 also shows that an influence thereof extends from 500 nm to 600 nm. The influence is that light having a polarization plane to pass through is absorbed. In other words, the transmittance of the light to be transmitted is suppressed. Thus, the transmission curve A in FIG. 6 shows a small transmittance value in the wavelength of 500 nm to 600 nm.

For polarizers applied to light in the infrared region, light to be transmitted has a wavelength far away from the wavelength of the resonance absorption and the above influence is at a negligible level, causing practically no problem. In contrast, when realizing polarizers for visible light, the above influence is at a level that cannot be ignored. Therefore, to realize a polarizer applied to visible light, a new technical means for minimizing light absorption in the wavelength range of 500 nm to 600 nm is needed.

Patent Document 1: Japanese Patent Application Laid-Open No. 2004-77850
Patent Document 2: Japanese Patent Application Laid-Open No. 2002-519743
Patent Document 3: Japanese Patent Application Laid-Open No. 2000-206507
Patent Document 4: U.S. Pat. No. 4,479,819
Patent Document 5: Japanese Patent No. 1618477
Patent Document 6: Japanese Patent No. 2740601
Patent Document 7: Japanese Patent No. 2885655
Patent Document 8: Japanese Patent Application Laid-Open No. 2004-523804
Patent Document 9: Japanese Examined Application Publication No. 2-40619
Patent Document 10: Japanese Patent No. 2628014

Patent Document 11: Japanese Patent No. 3549198
Non-Patent Document 1: N. Nishida, "Big-Screen Display (Series, Advanced Display Technology 7)", Kyoritsu Shuppan, Tokyo, 2002
Non-Patent Document 2: S. Link and M. A. El-Sayed, J. Phys. Chem. B103 (1999), pp. 8410-8426
Non-Patent Document 3: K. Suzuki, Kogyo Zairyo Vol. 52, No. 12, pp. 102-107

DISCLOSURE OF THE INVENTION

Problems to be Solved by the Invention

An object of the present invention is to provide a glass polarizer having an excellent transmittance and extinction ratio with respect to light of a wide wavelength range including a blue region.

Another object of the present invention is to provide a glass polarizer in which photochromism does not appear.

Means for Solving the Problems

Glass polarizers in the present invention use surface plasmon resonance of metallic fine particles having shape anisotropy oriented and dispersed in the glass.

As a result of studying the above problems of conventional technologies, the inventors successfully produced a glass polarizer with improved transmittance in the visible light range (near 500 nm) by adding a new idea to the manufacturing process of polarizers in which silver halide is used as a starting material.

A method of manufacturing a glass polarizer according to a first embodiment of the present invention includes the steps of: producing borosilicate glass in which silver halide particles are dispersed and deposited; generating metallic silver particles in the glass by reducing the silver halide particles; and generating silver particles oriented and stretched in the glass by heating the glass to stretch after the reduction step.

A manufacturing method of a glass polarizer according to a second embodiment of the present invention includes the steps of: producing borosilicate glass in which silver halide particles are dispersed and deposited; generating metallic silver particles in the glass by reducing the silver halide particles; heating the glass to stretch the glass after the reduction step; and generating silver particles oriented and stretched in the glass by a step of reducing silver halide remaining in the glass again after stretching.

In a conventional process, silver halide particles are reduced after the glass is stretched to manufacture glass polarizers in which metallic silver fine particles having shape anisotropy are oriented and dispersed. In the present invention, the process is reversed and at least a portion of silver halide particles in the glass are first reduced and then the glass is stretched to obtain glass in which metallic silver fine particles having shape anisotropy are oriented and dispersed.

A new manufacturing process can be summarized as illustrated in FIG. 7

Step 1 (glass production): Produce glass in which halogen ions and silver ions are dissolved.

Step 2 (silver halide deposition): Cause silver halide fine particles to deposit by heat treatment.

Step 3 (reduction): Reduce at least a portion of silver halide deposited in the glass.

Step 4 (glass stretching): Stretch the glass in which at least partially reduced silver halide fine particles are dispersed to obtain glass in which silver fine particles having shape anisotropy are oriented and dispersed.

It was confirmed that a glass polarizer manufactured by the above manufacturing process could realize excellent polarization characteristics of a polarization region extended to 440 nm or below and a high transmittance in the wavelength range of light near 500 nm.

Furthermore, the inventors further developed the above manufacturing method (FIG. 7). That is, the inventors focused on the fact that at step 3 (reduction), all silver halide fine particles are not always reduced and a portion thereof remains in the glass as silver halide particles. The silver halide becomes silver halide having shape anisotropy at step 4. By reducing the silver halide again, metallic silver particles having optically different properties can be obtained.

This process can be summarized as follows:

Step 1 (glass production): Produce glass in which halogen and silver ions are dissolved.

Step 2 (silver halide deposition): Cause silver halide fine particles to deposit by heat treatment.

Step 3 (reduction): Reduce at least a portion of silver halide deposited in the glass.

Step 4 (glass stretching): Stretch the glass in which at least partially silver halide fine particles are dispersed.

Step 5 (re-reduction): Reduce remaining silver halide by reducing the silver halide deeply to obtain metallic silver fine particles having shape anisotropy.

With this process, glass in which silver fine particles optically different in property and having shape anisotropy is obtained.

Reflecting the presence of metallic silver fine particles of different properties, a glass polarizer produced by the above method realized polarization characteristics in a wide wavelength range. That is, as will be described in detail later, the inventors found that a glass polarizer having excellent polarizability of the extinction ratio of 25 dB or more over all wavelengths of 500 nm to 2000 nm can be realized.

The present invention is based on conventional technology considering that glass material in which silver halide is deposited and dispersed is used as a starting material, but some technologies are added to realize functions to be effective for light in the visible light region.

A mercury lamp is used in a projection-type liquid crystal display as a light source and a visible light source contains in most cases components of ultraviolet light. Glass in which silver halide fine particles are deposited, which is widely known under the name of photochromic glass, has properties that when the glass is irradiated with ultraviolet light, an absorption band extending from the visible light region to the near-infrared region is produced to color the glass and when the ultraviolet light is blocked, the state before irradiation is restored. Thus, it is preferable to select a material in which photochromism does not appear as a material for polarizing glass for the visible light region according to the present invention.

Conventional technologies regarding polarizing glass exhibiting no photochromism include a technology in which CuO is hardly contained in the glass or the base glass composition is limited (Patent Document 9). In this example, a condition of $(R_2O-Al_2O_3): B_2O_3 < 0.25$ in molar ratio is adopted. Also, a technology in which substantially no CuO is contained in the glass and an amount of $CeO_2$ effective in maintaining silver in the glass in an oxidation state is added (Patent Document 10) is known. A technology to prevent reduction of silver to metal silver by limiting the composition in which basicity of glass is increased by containing substantially no CuO, containing a large amount of $K_2O$, and adding BaO (Patent Document 11) is also known.

In the present invention, after nitrate was added for 0.5 to 5 wt % of alkali oxides as glass material in glass melting, silver was dissolved as ions in the glass so that non-photochromic glass was obtained. That is, non-photochromic glass was successfully obtained without adding CuO or $CeO_2$ used in the conventional technologies as an oxidizing agent and limiting the composition of the base glass.

Effect of the Invention

According to the present invention, as described above, polarizers having polarizability with respect to light in the blue region and those excellent in transmittance with respect to light in the green region can be realized. Further, wide-band glass polarizers having polarizability in the wavelength range of 500 nm to 2000 nm can be provided. By applying glass polarizers having the above performance and excellent in heat resistance and light resistance (particularly ultraviolet light resistance) to a projection-type liquid crystal display, a smaller and clearer display can be realized. Naturally, the present invention can widely be used in general optical systems and effects thereof are not limited to projection-type liquid crystal displays.

BEST MODE FOR CARRYING OUT THE INVENTION

Figure 1:
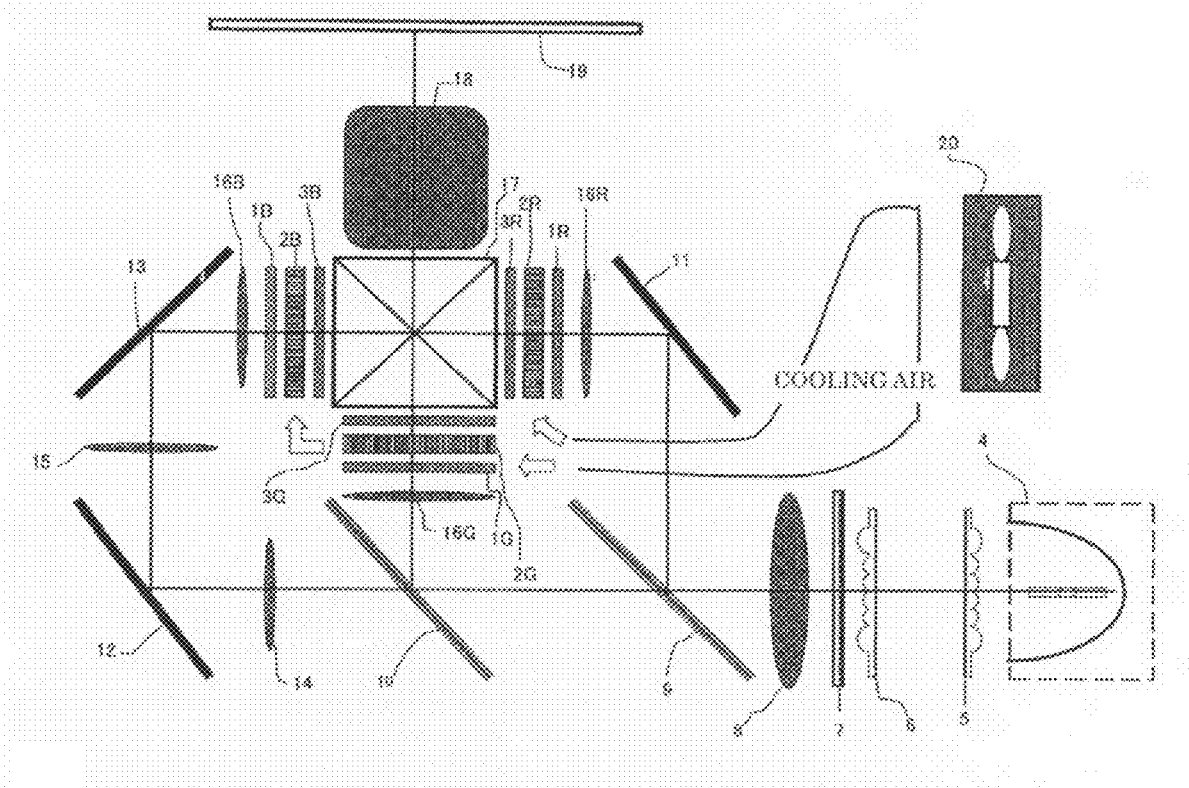
FIG. 1 is a conceptual diagram of an optical engine of a liquid crystal projector (Patent Document 1).
Figure 2:
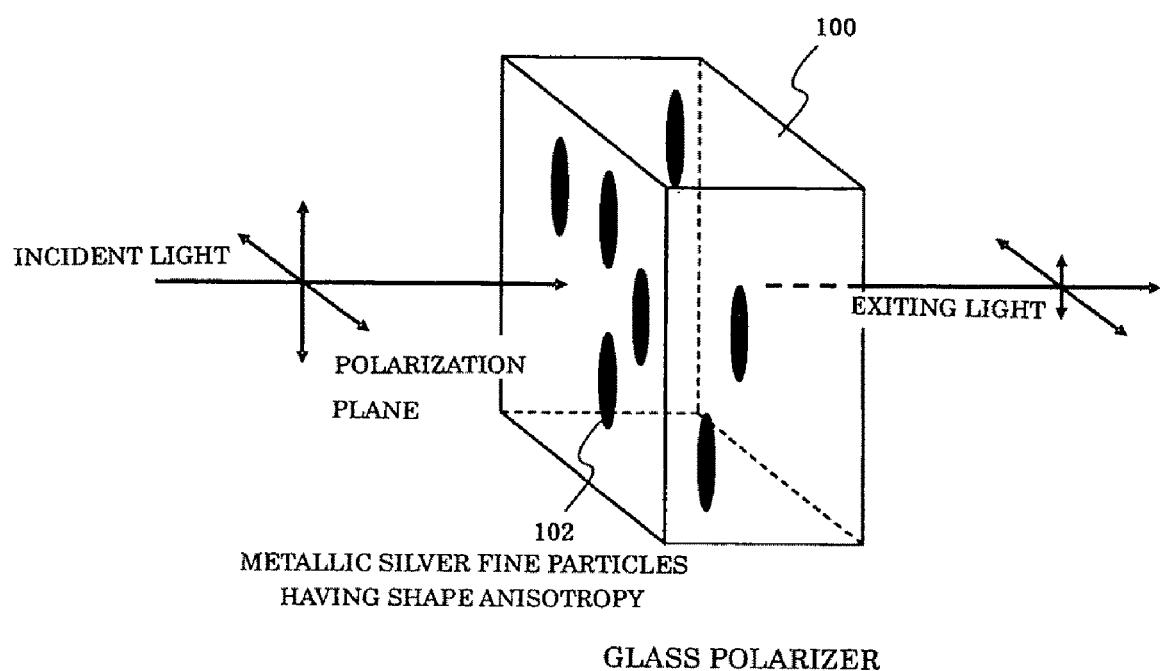
FIG. 2 is a diagram conceptually illustrating a function of a glass polarizer.
Figure 3:
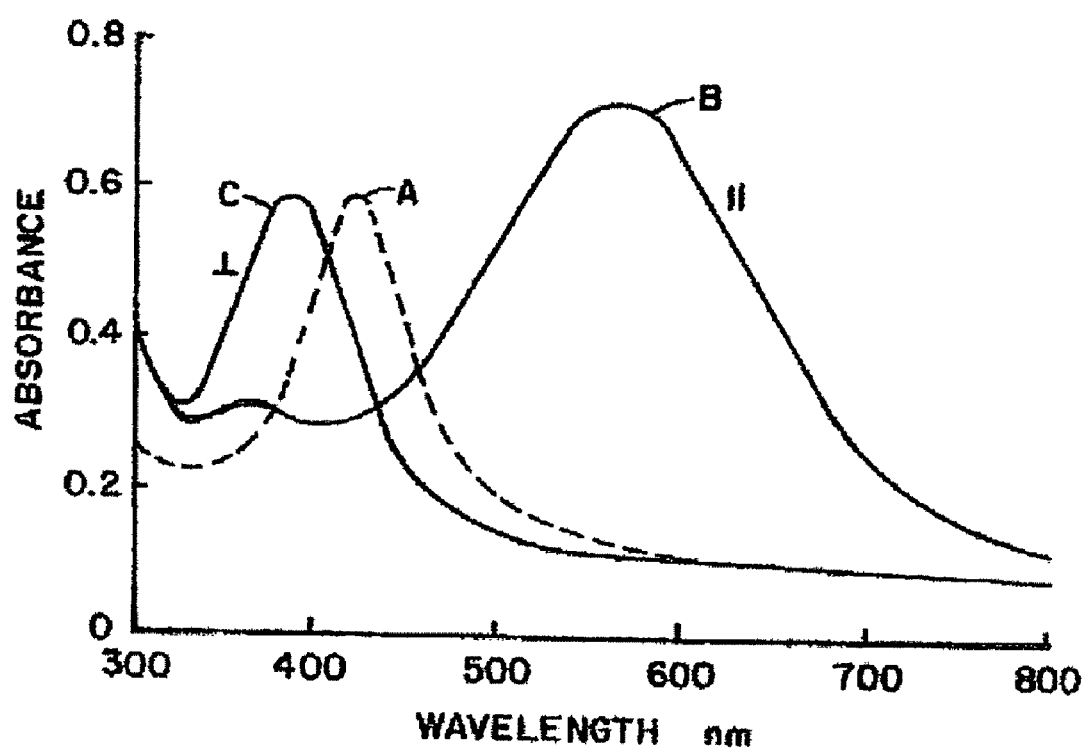
FIG. 3 is a graph showing optical absorption spectra of stretch-oriented silver particles having shape anisotropy and spherical silver particles (Patent Document 4).

An embodiment of the present invention will be described below. In a manufacturing technology according to an embodiment of the present invention, based on a known technology to manufacture polarizing glass for infrared light, the deposition and reduction processes of silver halide are devised and further, a technology to prevent appearance of photochromism is added.

First, a batch of glass of predetermined composition is prepared. At this point, the following conditions should be noted in selecting the composition and material. It is preferable to select glass that does not have so-called photochromic characteristics in which the transmittance is degraded due to light irradiation as glass applied to polarizers used in the visible light region. For this purpose, it is necessary, for example, to strictly avoid impurity mixing of copper oxide in the glass material. Also, amounts of silver and halogen to be added are selected so that both the transmittance and extinction ratio are consistent in the end.

A batch of glass of the predetermined composition is melted and poured into a mold to produce plate-shaped glass. Next, silver halide is caused to deposit by heat treatment. In this case, it is preferable to perform a polishing process before a silver halide deposition process, but it is also possible to heat-treat molded plate-shaped glass to cause silver halide fine particles to deposit and then, to produce a preform through a predetermined process. A preform for stretching is produced through any of the manufacturing processes. Heat treatment conditions for silver halide deposition are optimized depending on the composition of the glass and added amounts of silver and halogen.

While the plate-shaped preform is immediately transferred to a stretch process in a conventional process, according to the manufacturing technology in the present invention, reduction treatment is performed on the preform from the surface to reduce a portion or all of silver halide to metallic silver particles.

Next, stretch treatment is performed on the preform after the reduction treatment. In the stretch process, the preform is stretched by adjusting the viscosity (more directly, the heating temperature) and stretching stress (force to stretch the glass=load on the glass) of the glass so that metallic silver particles have an appropriate aspect ratio. After the stretched glass being polished, an anti-reflection film is formed on the glass, and a polarizer according to the present invention is completed.

As a development of the technology, a polarizer having a wider wavelength range of polarization can be obtained by performing reduction heat treatment of the stretched glass again to reduce at least a portion of non-reduced silver halide remaining in the glass before forming an anti-reflection film.

EMBODIMENTS

The present invention will be specifically described below using embodiments and a reference. Table 1 shows main conditions of the embodiments and the reference. However, the technical scope of the present invention is not limited to the embodiments shown below.

Embodiment 1

Embodiment in the Green Region

First, a batch of material was prepared by mixing $SiO_2$, $H_3BO_3$, $Al(OH)_3$, $Li_2CO_3$, $NaNO_3$, $(Na_2CO_3)$, $K_2CO_3$, NaCl, and AgCl as materials so that $SiO_2$: 58.6%, $B_2O_3$: 18.3%, $Al_2O_3$: 9.5%, $Li_2O$: 1.9%, $Na_2O$: 2.0%, $K_2O$: 9.6%, Ag: 0.32%, and Cl: 0.37% by weight. At this time, 2% by weight of $Na_2O$ was mixed using $NaNO_3$ (sodium nitrate), which is a nitrate material. The batch of material was melted at 1430° C. for four hours in a platinum crucible of 300 cc capacity and then poured into a mold and pressed by a roller to obtain plate-shaped glass of approximately 250×60×2.5 mm in thickness.

The plate-shaped glass was heat-treated at 670° C. for five hours to cause silver chloride particles to deposit. After polishing the surface of the heat-treated plate glass, reduction treatment was performed on the plate glass under reduction conditions shown in Table 1, that is, at 430° C. for 10 hours while a hydrogen gas being caused to flow at a rate of about 1.5 liter/min in a reducing furnace to generate silver particles near the surface thereof.

The glass plate was set vertically in a drafting oven and was heated to stretch while the preform being moved downward at a constant rate by balancing the feed speed and receipt speed of the preform. The viscosity and stretching tension (load on the glass per unit area) of the glass while being stretched are shown in Table 1.

Reference 1

Plate-shaped glass of the same composition as that in Embodiment 1 was produced using the same melting and processing conditions. The plate-shaped glass was heat-treated at 620° C. for five hours to cause silver chloride fine particles to deposit. The plate-shaped glass was stretched by applying stretching tension of 650 Kgf/cm$^2$ in a drafting oven under conditions of the glass viscosity of $10^{10.8}$ poise.

Reduction treatment was performed on the obtained glass tape under reduction conditions shown in Table 1 while a hydrogen gas being caused to flow at a rate of about 1.5 liter/min in a reducing furnace. After the glass tape was cut to a length of about 50 mm and both faces thereof were polished, an anti-reflection film was formed on the surface thereof. Results of measurement of polarization characteristics obtained thereafter are shown in FIG. 9. The transmittance at 520 nm does not reach 80% and comparison with FIG. 8 of Embodiment 1 shows that the overall transmittance on a wavelength side longer than 520 nm is low.

TABLE 1

Figure 8:
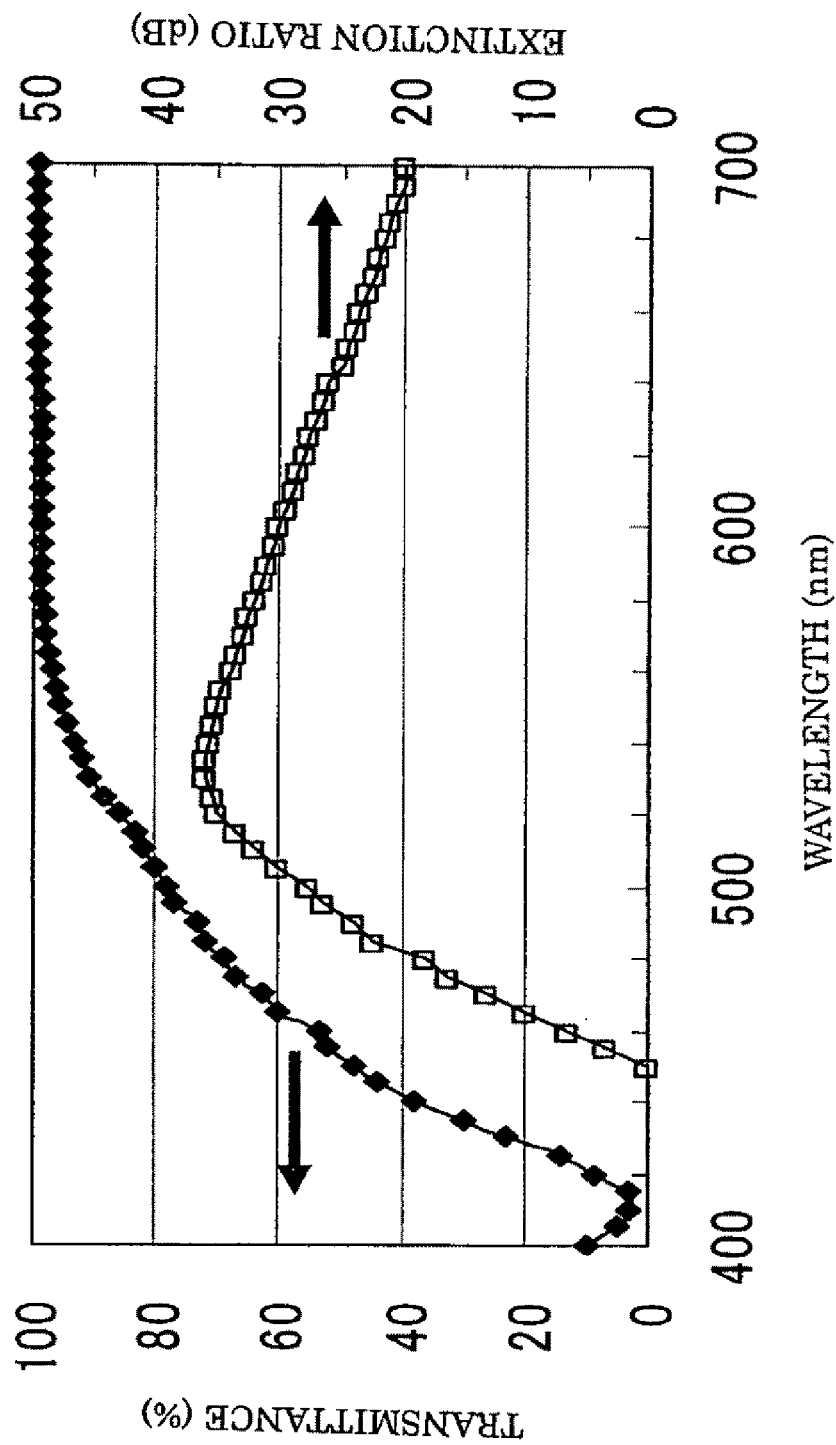
FIG. 8 is a graph showing transmittance and extinction ratio curves in the wavelength range of 400 to 700 nm of the glass polarizer in Embodiment 1.
Figure 9:
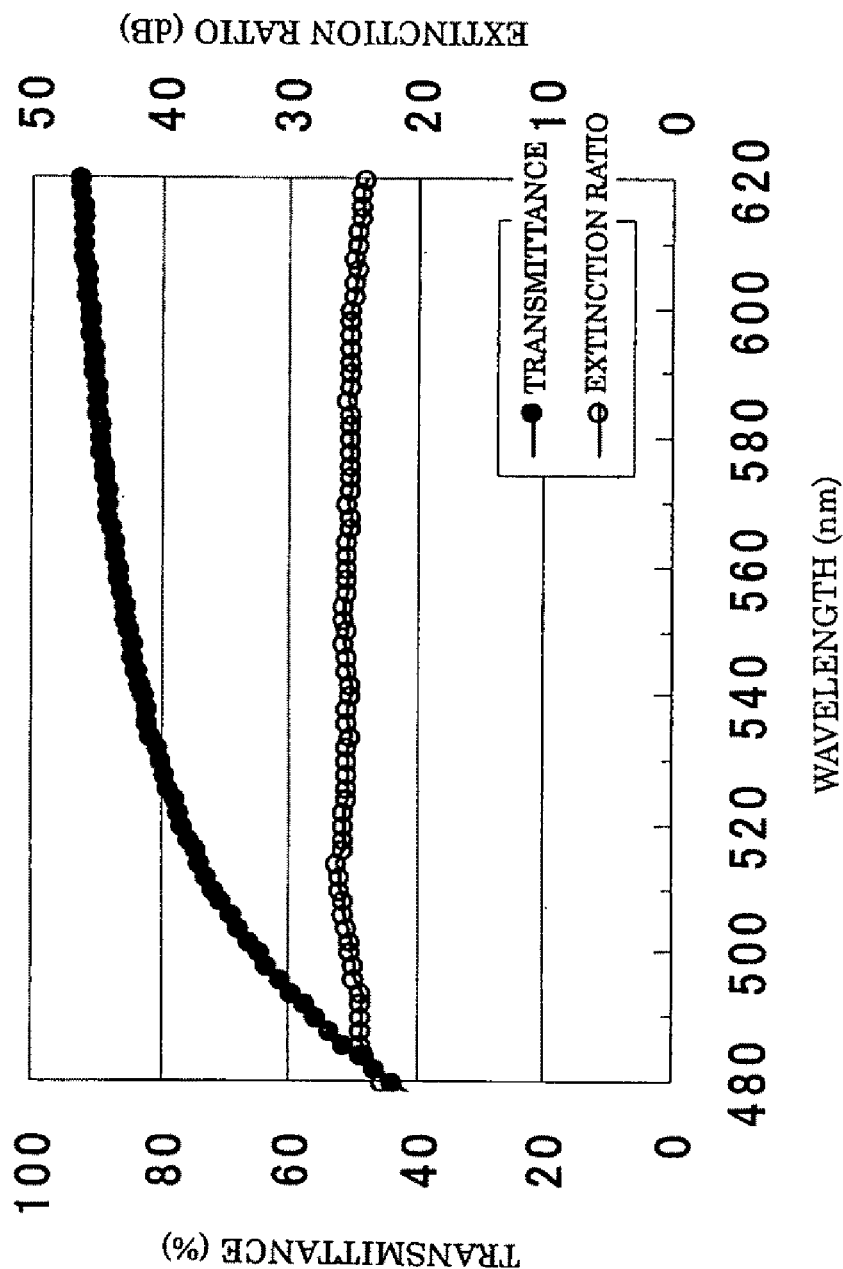
FIG. 9 is a graph showing transmittance and extinction ratio curves in the wavelength range of 480 to 620 nm of Reference 1.
Figure 10:
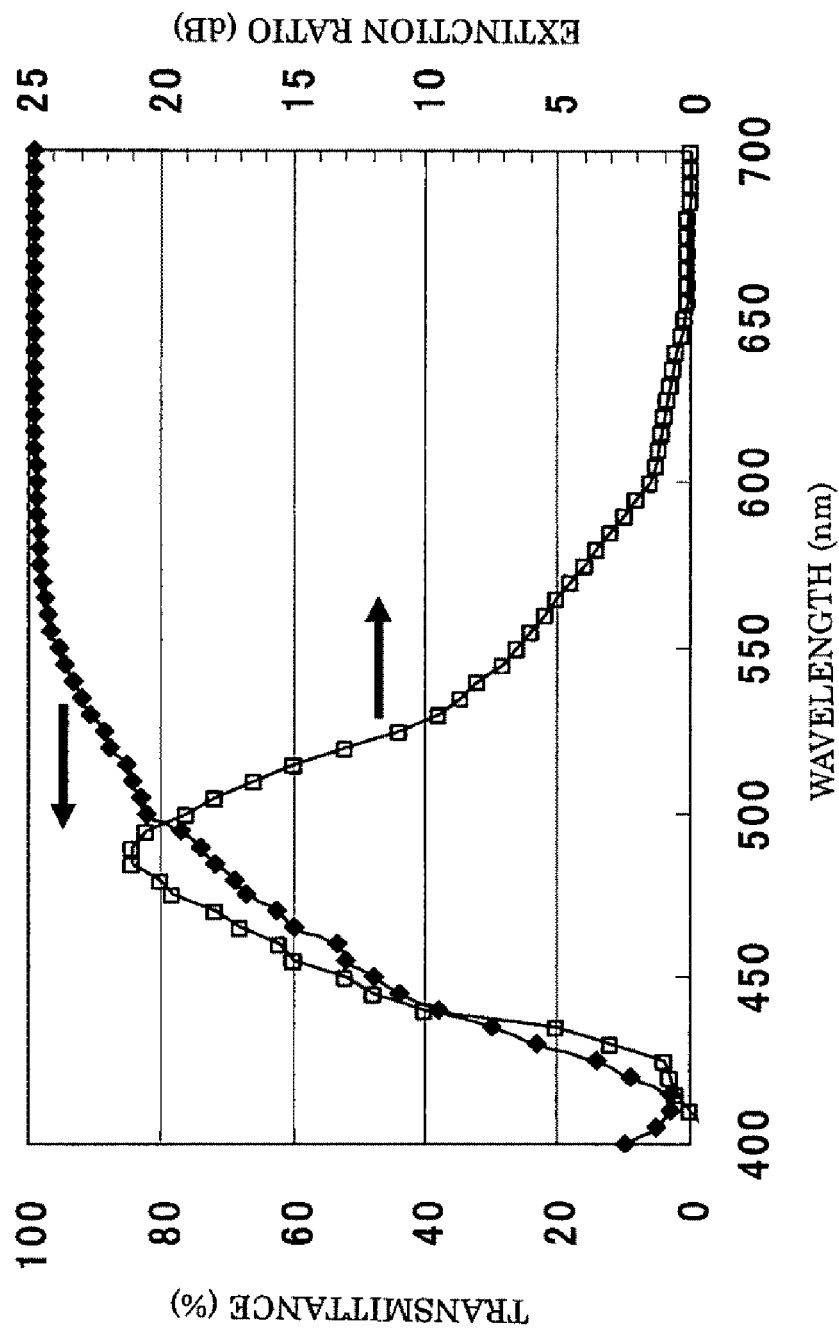
FIG. 10 is a graph showing transmittance and extinction ratio curves in the wavelength range of 400 to 700 nm of Embodiment 2.
Figure 11:
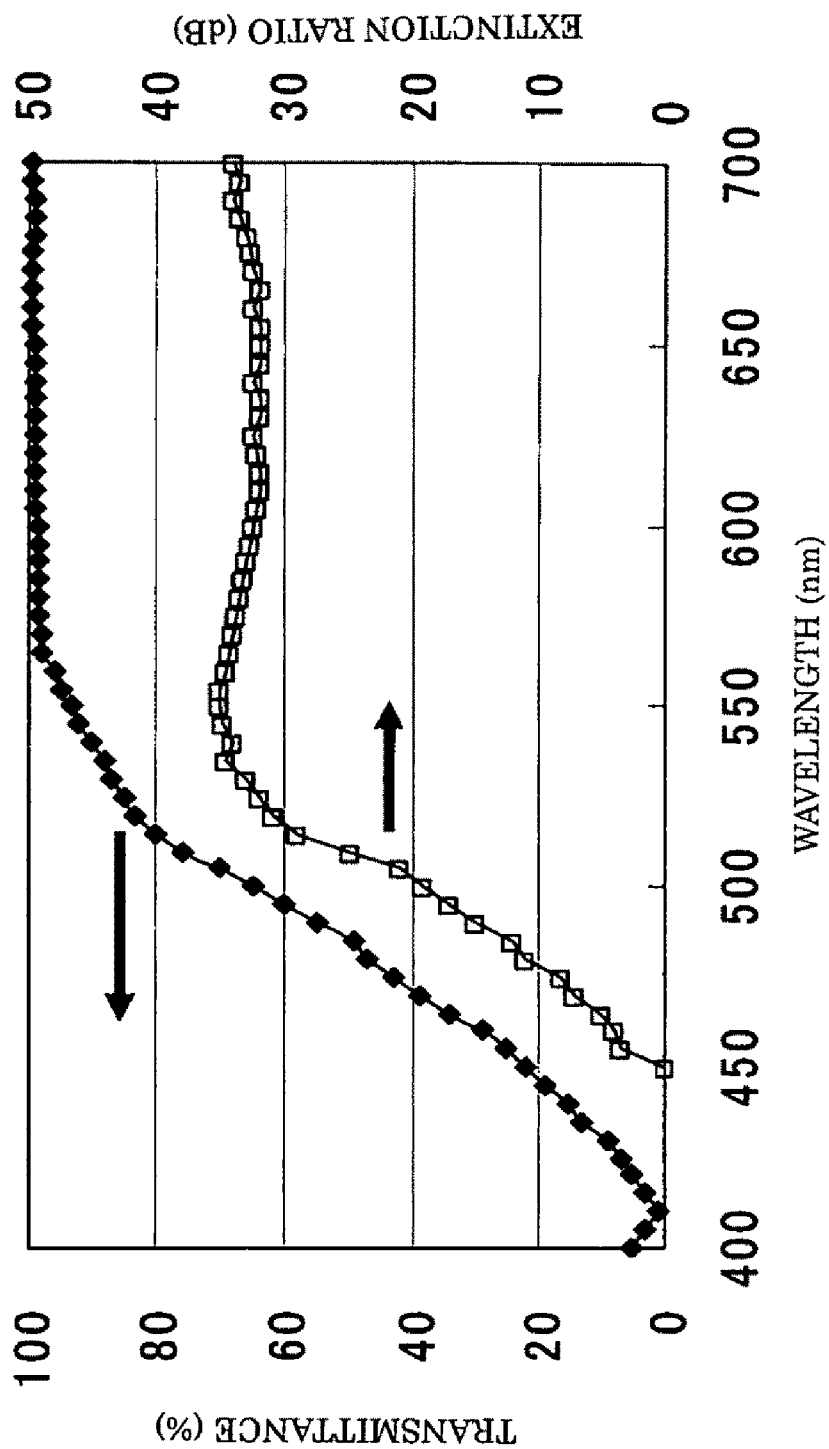
FIG. 11 is a graph showing transmittance and extinction ratio curves in the wavelength range of 400 to 700 nm of Embodiment 3.
Figure 12:
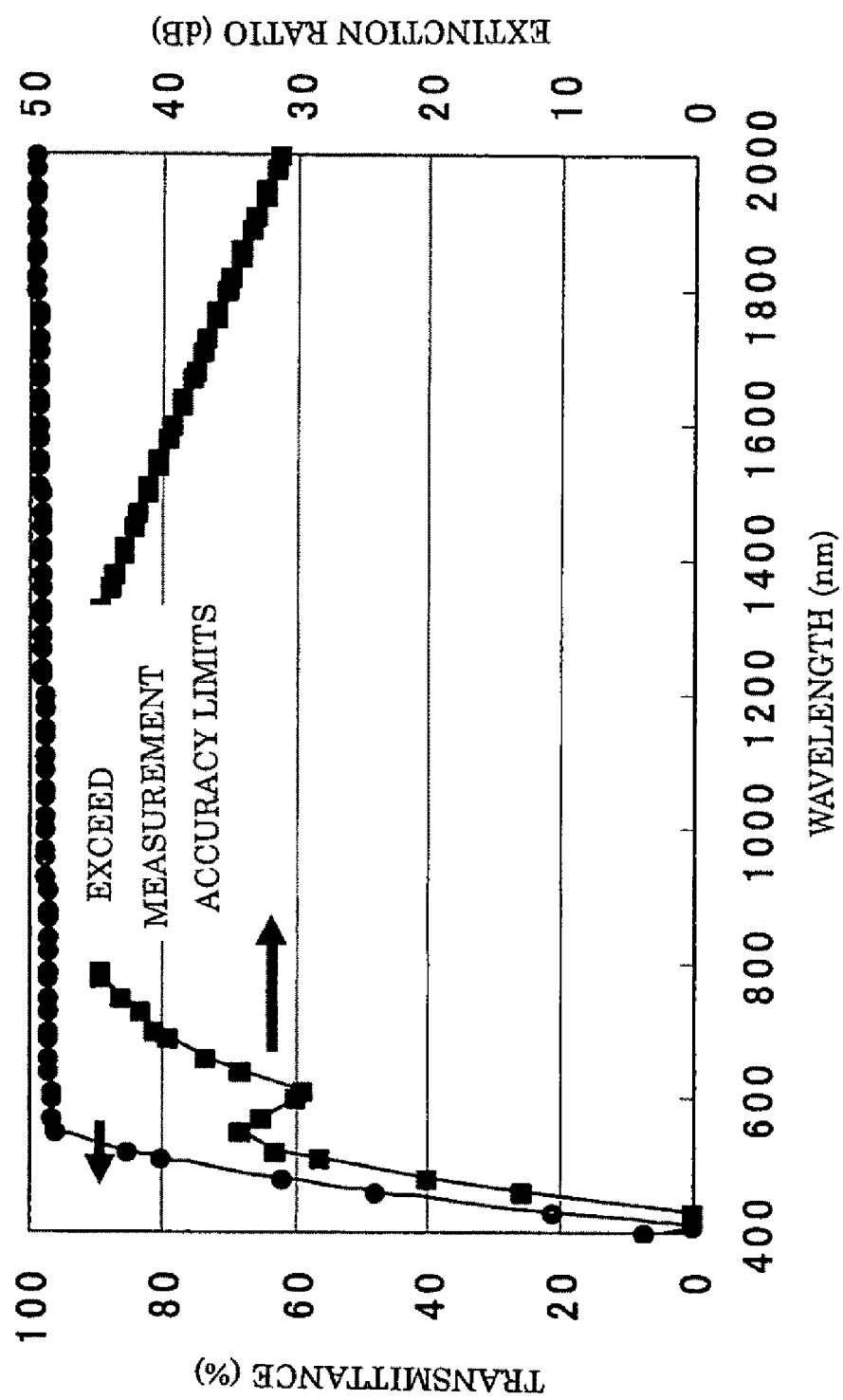
FIG. 12 is a graph showing transmittance and extinction ratio curves in the wavelength range of 400 to 2000 nm of Embodiment 4.
Figure 13:
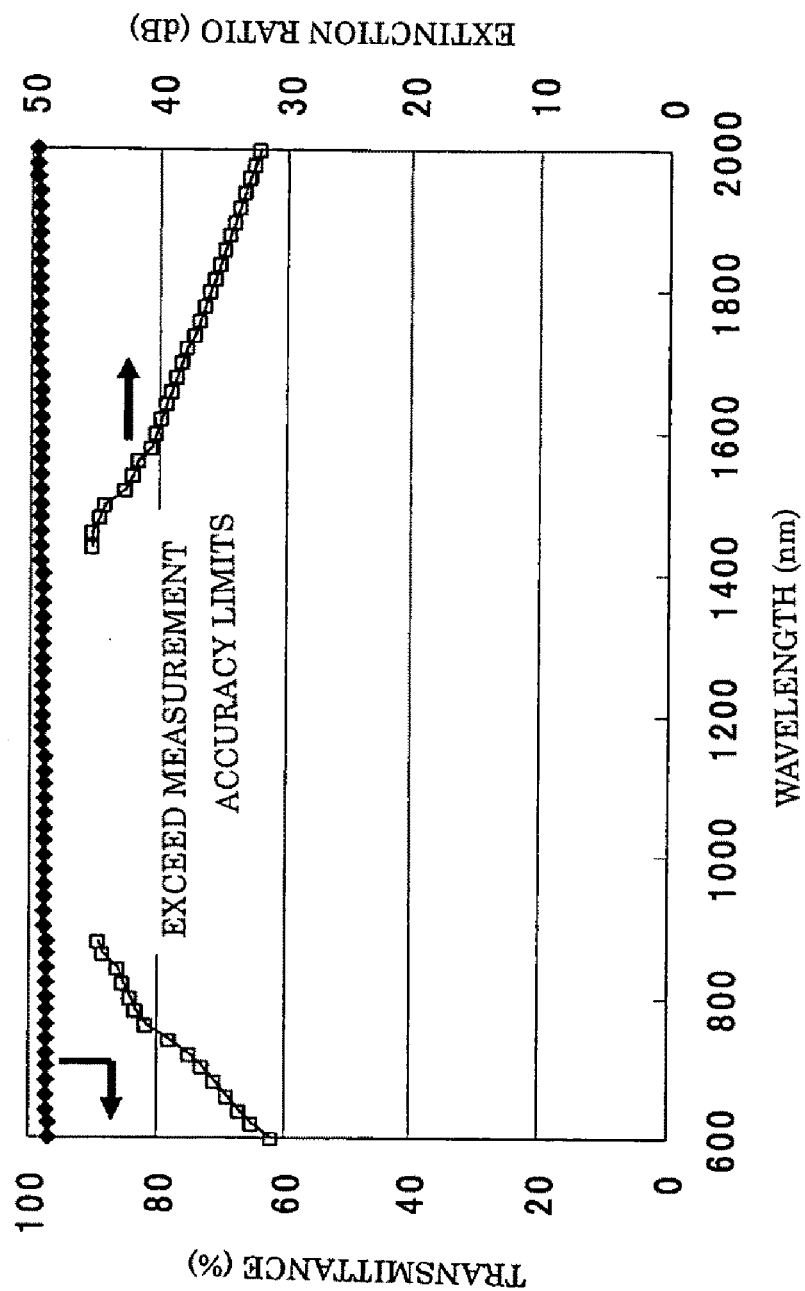
FIG. 13 is a graph showing transmittance and extinction ratio curves in the wavelength range of 600 to 2000 nm of Embodiment 5.

| | | Emb. 1 | Emb. 2 | Emb. 3 | Emb. 4 | Emb. 5 | Ref. 1 |
|---|---|---|---|---|---|---|---|
| Treatment method | | Silver chloride deposition ⇒ reduction ⇒ stretching | Same as left | Same as left | Silver chloride deposition ⇒ reduction ⇒ stretching ⇒ reduction | Same as left | Silver chloride deposition ⇒ stretching ⇒ reduction |
| Silver chloride deposition conditions (temperature, time) | | 670° C. 5 hrs | 650° C. 5 hrs | 700° C. 5 hrs | 700° C. 5 hrs | 700° C. 5 hrs | 620° C. 5 hrs |
| Reduction conditions after silver chloride deposition | | 430° C. 10 hrs | 430° C. 10 hrs | 490° C. 10 hrs | 420° C. 10 hrs | 490° C. 10 hrs | No reduction |
| Stretching conditions | Glass viscosity (poise) | $10^{10.8}$ | $10^{10.5}$ | $10^{10.8}$ | $10^{9.9}$ | $10^{9.8}$ | $10^{10.8}$ |
| | Stretching tension (Kgf/cm$^2$) | 700 | 660 | 700 | 640 | 700 | 650 |
| Reduction conditions after stretching | | No reduction | Same as left | Same as left | 420° C. 10 hrs | 420° C. 10 hrs | 445° C. 6 hrs |
| Polarization characteristics | Transmittance (%) | FIG. 8 | FIG. 10 | FIG. 11 | FIG. 12 | FIG. 13 | FIG. 9 |
| | Extinction ratio (dB) | FIG. 8 | FIG. 10 | FIG. 11 | FIG. 12 | FIG. 13 | FIG. 9 |
| Remarks | | Green region | Blue region | Red region | Embodiment of wide band including visible light | Same as left | Reference relative to Embodiment 1 |

A stretched glass tape was cut to a length of about 50 mm and both faces thereof were polished. Then, an anti-reflection film was formed on the surface thereof. A film formation process in this case is to set a plurality of samples in a vacuum chamber after washing and drying the plurality of samples to form an alternate 4-layer film (anti-reflection film) of SiO$_2$ and Ta$_2$O$_5$ on both sides of the samples by the sputtering method. An anti-reflection effect was thereby provided.

Changes in light beam transmittance and extinction ratio of the glass polarizer obtained in this manner in the wavelength range of 400 nm to 700 nm are shown in FIG. 8. FIG. 8 shows that at 520 nm, the transmittance is 80% or more and the extinction ratio is 25 dB or more.

The extinction ratio was calculated based on the transmittance T$_\perp$(T1)% of light having a polarization plane perpendicular to the longitudinal direction of metallic silver particles in each wavelength in transmission spectra measured by using a spectrophotometer and the transmittance T$_\parallel$(T2)% of light having a polarization plane in parallel to the longitudinal direction of metallic silver particles using formulas shown below:

Extinction ratio (dB)=10 log($T_\perp/T_\parallel$)

Extinction ratio (dB)=10 log($T1/T2$)

Embodiment 2

Embodiment in the Blue Region

A glass preform prepared in the same manner to be of the same composition as that in Embodiment 1 was heat-treated at 650° C. for five hours to cause silver chloride to deposit and then, reduced in a hydrogen gas flow at 430° C. for 10 hours. Further, the glass perform was heated to stretch under the condition of 660 Kgf/cm$^2$ (Embodiment 2 in Table 1). The stretched glass tape was cut to a length of about 50 mm and both faces thereof were polished. Then, an anti-reflection film was formed on the surface thereof by the same technique as that in Embodiment 1.

Figure 4:
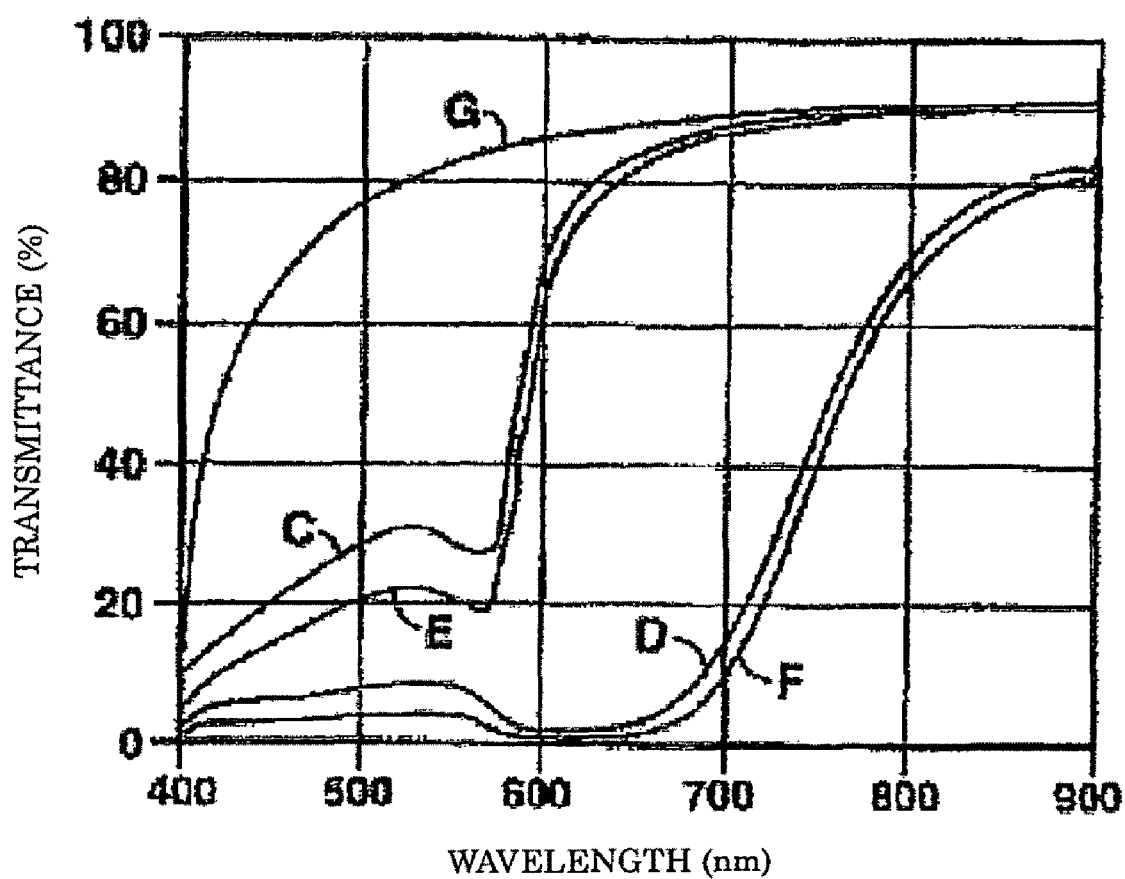
FIG. 4 is a graph showing conventional technology of polarizing glass for visible light (Patent Document 7), which shows transmittance curves of glass polarizers for visible light using stretch-oriented copper particles.
Figure 5:
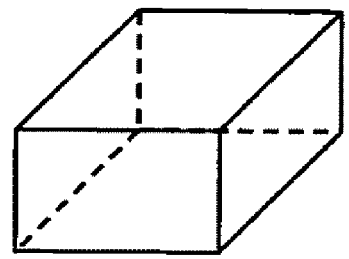
FIG. 5 is a diagram showing a glass polarizer manufacturing process using silver halide.
Figure 5:
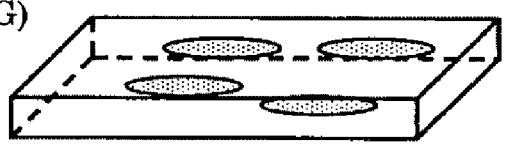
Figure 5:
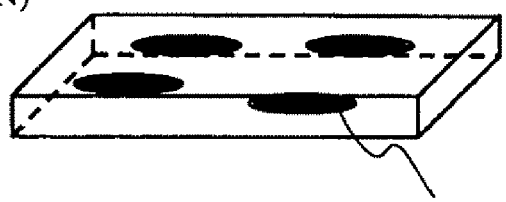
Figure 6:
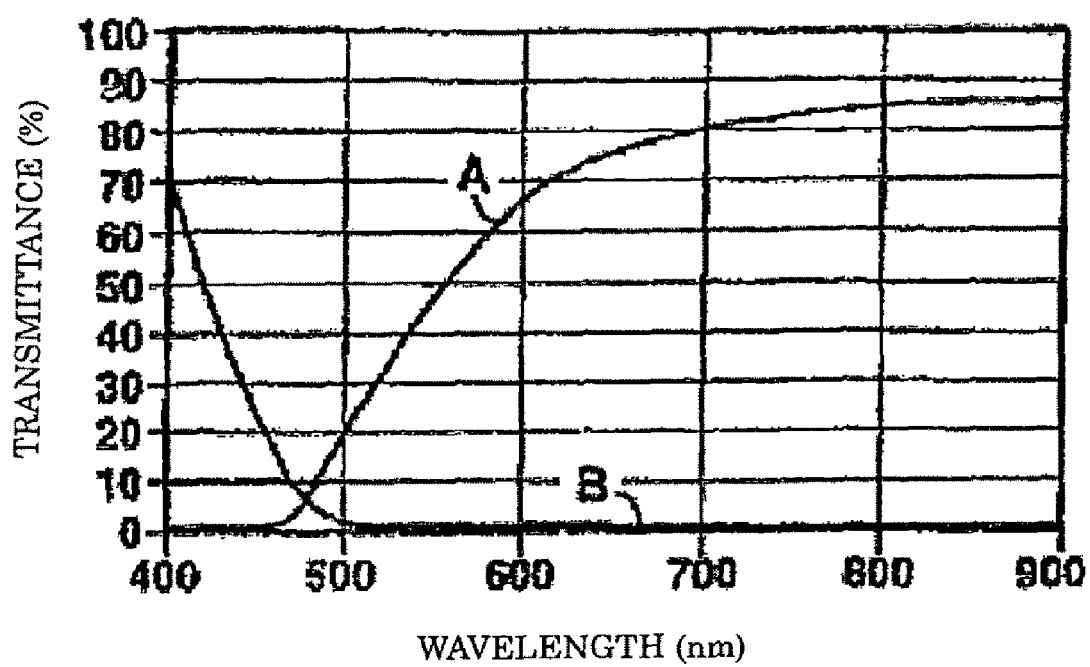
FIG. 6 is a graph showing transmittance curves of glass polarizers for visible light using stretch-oriented silver particles disclosed in the conventional technology (Patent Document 7).
Figure 7:
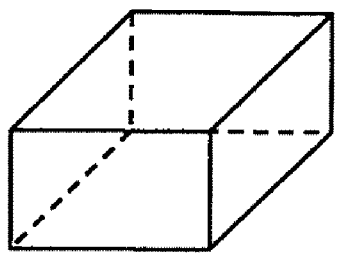
FIG. 7 is a diagram showing a manufacturing process of the present invention.
Figure 7:
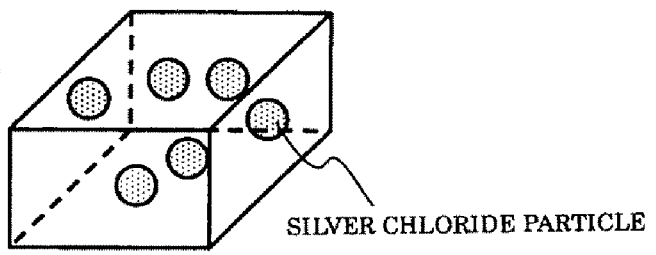
Figure 7:
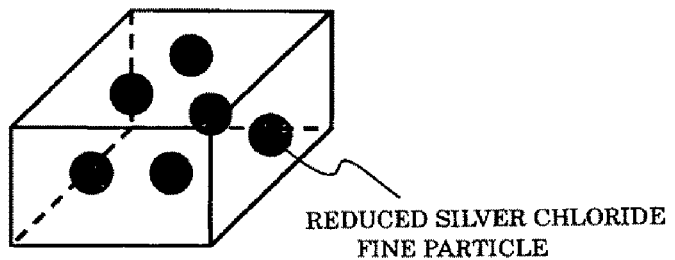
Figure 7:
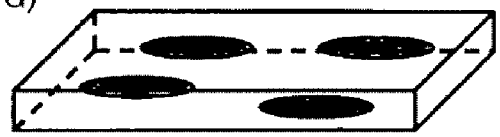

Results of measurement of polarization characteristics of the glass polarizer produced in the above process are shown in FIG. 10. Results of measurement extend over the wavelength range of 400 nm to 700 nm. Effective polarization characteristics are exhibited at the wavelength of 430 nm in the blue region and the extinction ratio of 10 dB is obtained at the wavelength of 440 nm. It is clear that evidently superior polarization characteristics are obtained as compared with the conventional technology shown in FIG. 4.

Embodiment 3

Embodiment in the Red Region

A glass preform prepared in the same manner to be of the same composition as that in Embodiment 1 was heat-treated at 700° C. for five hours to cause silver chloride to deposit and then, reduced in a hydrogen gas at 490° C. for 10 hours. Further, the glass perform was heated to stretch under the condition of 700 Kgf/cm$^2$ as shown in Embodiment 3 in Table 1. The stretched glass tape was cut to a length of about 50 mm and both faces thereof were polished. Then, an anti-reflection film was formed on the surface thereof. Results of measurement of polarization characteristics obtained thereafter are shown in FIG. 11.

Results of measurement extend over the wavelength range of 400 nm to 700 nm. The high extinction ratio of 20 dB or more is observed in the range of 500 nm to 700 nm and 30 dB or more in the red region of 600 nm to 700 nm. By setting conditions suitably in this manner, the present invention can realize polarizers of different wavelength ranges.

Embodiment 4

Embodiment of Wide Band Including Visible Light

Plate-shaped glass was produced to be of the same composition and under the same conditions as in Embodiment 1. The plate-shaped glass was heat-treated at 700° C. for five hours to cause silver chloride particles to deposit. After polishing the surface of the heat-treated plate glass, reduction treatment was performed on the plate glass under reduction conditions shown in Table 1, that is, at 420° C. for 10 hours while a hydrogen gas being caused to flow at a rate of about 1.5 liter/min in a reducing furnace to generate silver particles near the surface thereof.

The glass plate having silver particles generated near the surface thereof was set vertically in a drafting oven and was heated to stretch while the preform being moved downward at a constant rate by balancing the feed speed and receipt speed of the preform. The viscosity and stretching tension (load on the glass per unit area) of the glass in the stretching are shown in Table 1.

The process up to here is the same as that in Embodiment 1. Next, reduction treatment was performed again on the obtained glass tape under reduction conditions shown in Table 1 while a hydrogen gas being caused to flow at a rate of about 1.5 liter/min in a reducing furnace. Next, the glass tape obtained in this manner was cut to a length of about 50 mm and both faces thereof were polished. Then, an anti-reflection film was formed on the surface thereof.

Results of measurement of polarization characteristics of the obtained glass polarizer are shown in FIG. 12. The polarizer exhibits the extinction ratio of 25 dB at the wavelength of 500 nm in the visible light range and at the same time, excellent polarizability and high optical transmittances in a wide wavelength range of up to 2000 nm. That is, a glass polarizer having polarizability extending from the visible blue region to the near-infrared region that could not be realized by conventional technology was realized.

Embodiment 5

Embodiment in Long-Wave Wide Band

A glass preform prepared in the same manner to be of the same glass composition as that in Embodiment 1 was heat-treated at 700° C. for five hours to cause silver chloride to deposit and then, reduced in a hydrogen gas at 490° C. for 10 hours and further stretched under the conditions shown in Embodiment 5 in Table 1. Next, reduction treatment was performed again on the obtained glass tape under reduction conditions shown in Table 1 while a hydrogen gas being caused to flow at a rate of about 1.5 liter/min in a reducing furnace. Next, the glass tape obtained in this manner was cut to a length of about 50 mm and both faces thereof were polished. Then, an anti-reflection film was formed on the surface thereof. Results of measurement of polarization characteristics obtained thereafter are shown in FIG. 13. High extinction ratios of 30 dB or more and high transmittances of 97% or more were exhibited in a wide wavelength range of 600 nm to 2000 nm.

Next, a 500-W xenon lamp was shone 40 cm apart on glass polarizers obtained in Embodiments 1 to 5 (and Reference 1) for 15 minutes to visually observe changes in color of the glass due to irradiation and also a change in transmittance at 650 nm before and after irradiation was measured to determine whether or not photochromic characteristics are present. Observation and measurement results showed that no change before and after irradiation was observed in all polarizers obtained in Embodiments 1 to 5 (and Reference 1), confirming that no photochromic characteristics were exhibited. This means that degradation of polarization characteristics and deterioration of transmittance characteristics of glass polarizers according to the present invention will not be caused by irradiation of ultraviolet or visible short wavelength light.

As described above, glass polarizers manufactured by a manufacturing method characterized in that at least a portion of borosilicate glass in which silver halide particles are dispersed and deposited by heat treatment is reduced and then, heated for stretching to generate oriented and stretched silver particles in the glass have, compared with those manufactured by conventional technologies, superior polarization characteristics described below.

According to the present invention, effective polarization characteristics are exhibited in the blue wavelength range. In the green wavelength range of 500 nm to 600 nm, excellent optical transmittances of 80% or more and high extinction ratio are realized at the same time.

Moreover, glass polarizers manufactured by a manufacturing method characterized in that at least a portion of borosilicate glass in which silver and halogen are contained and silver halide particles are dispersed and deposited by heat treatment is reduced to generate metallic silver particles and then, oriented and stretched silver particles are generated in the glass by heating for stretching and then, reducing silver halide remaining in the glass have polarization characteristics of the extinction ratio of 25 dB or more with respect to light in the wavelength range of 500 nm to 2000 nm.

Further, by containing substantially no copper compound as a glass component and introducing a portion corresponding to 0.5 to 5 wt % in glass oxide composition by nitrate as glass material before melting, polarizers exhibiting no photochromic characteristics were obtained.

According to the present invention, excellent polarizers that can industrially be used in the wavelength range of visible light region including blue of 440 nm can be provided. In addition, according to the manufacturing method thereof, polarizers having excellent performance with respect to light in a wide range of wavelengths from the visible light range to the near-infrared region can also be manufactured.

The invention claimed is:

1. A method of manufacturing a glass polarizer, comprising the steps of:
   producing borosilicate glass in which silver halide particles are dispersed and deposited by heat treatment;
   reducing at least a portion of the silver halide particles to silver particles; and
   heating and stretching the glass in which silver and silver halide particles are dispersed to generate oriented and stretched silver and silver halide particles in the glass, wherein the glass polarizer exhibits polarizability in a wavelength range of 440 nm or more and has an extinction ratio of 10 dB or more, and the glass polarizer has a transmittance of 80% or more and a extinction ratio of 25 dB or more with respect to light whose wavelength is 520 nm or more.

2. A method of manufacturing a glass polarizer, comprising the steps of:
   producing borosilicate glass in which silver halide particles are dispersed and deposited by heat treatment;
   reducing at least a portion of the silver halide particles to silver particles;
   heating and stretching the glass including the silver and silver halide particles therein after the reduction step; and
   reducing silver halide remaining in the glass again after stretching to generate silver particles oriented and stretched in the glass, wherein the glass polarizer has polarization characteristics of an extinction ratio of 25 dB or more with respect to light of all wavelength range of 500 nm to 2000 nm.

* * * * *